(12) United States Patent
Snaman, Jr. et al.

(10) Patent No.: US 9,400,819 B2
(45) Date of Patent: Jul. 26, 2016

(54) UPDATING OBJECT ATTRIBUTES IN A LOCK-COUPLED NAMESPACE TRAVERSAL

(71) Applicant: Dell Products, LP, Round Rock, TX (US)

(72) Inventors: William Edward Snaman, Jr., Nashua, NH (US); Saikrishnan Krishnamurthy, Nashua, NH (US); Mitchell Condylis, Bedford, NH (US)

(73) Assignee: Dell Products, LP, Round Rock, TX (US)

( * ) Notice: Subject to any disclaimer, the term of this patent is extended or adjusted under 35 U.S.C. 154(b) by 427 days.

(21) Appl. No.: 13/913,216

(22) Filed: Jun. 7, 2013

(65) Prior Publication Data

US 2014/0365428 A1    Dec. 11, 2014

(51) Int. Cl.
*G06F 17/00* (2006.01)
*G06F 17/30* (2006.01)

(52) U.S. Cl.
CPC .... *G06F 17/30365* (2013.01); *G06F 17/30088* (2013.01); *G06F 17/30327* (2013.01)

(58) Field of Classification Search
CPC ............ G06F 17/30088; G06F 17/30327; G06F 17/30365
USPC ..................... 707/609, 797, E17.01
See application file for complete search history.

(56) References Cited

U.S. PATENT DOCUMENTS

| | | | | |
|---|---|---|---|---|
| 5,956,489 | A * | 9/1999 | San Andres | G06F 11/1662 709/221 |
| 6,392,667 | B1 * | 5/2002 | McKinnon | G06F 17/30961 345/428 |
| 7,370,055 | B1 | 5/2008 | Pande | |
| 7,483,906 | B2 | 1/2009 | MacCormick | |
| 7,577,658 | B2 | 8/2009 | Graefe | |
| 7,930,278 | B2 * | 4/2011 | Chandrasekaran | G06F 12/0817 707/610 |
| 7,953,717 | B2 | 5/2011 | Graefe | |
| 8,086,581 | B2 | 12/2011 | Oshri et al. | |
| 8,176,023 | B2 | 5/2012 | Graefe | |
| 8,209,515 | B2 | 6/2012 | Schott | |
| 2005/0262102 | A1 * | 11/2005 | Anderson | G06F 17/30091 707/E17.01 |
| 2006/0020572 | A1 * | 1/2006 | Ishii | G06F 17/30235 707/E17.01 |
| 2006/0288047 | A1 * | 12/2006 | Chron | G06F 17/30117 707/E17.01 |
| 2008/0086470 | A1 | 4/2008 | Graefe | |
| 2008/0104334 | A1 * | 5/2008 | Bellaton | G06F 12/0842 711/141 |
| 2009/0228511 | A1 * | 9/2009 | Atkin | G06F 17/30076 707/999.102 |
| 2009/0271408 | A1 | 10/2009 | Graefe | |
| 2011/0208704 | A1 | 8/2011 | Graefe | |
| 2012/0047188 | A9 * | 2/2012 | Chron | G06F 17/30117 707/813 |
| 2013/0066874 | A1 * | 3/2013 | Lunde | G06F 17/30943 707/738 |
| 2014/0215129 | A1 * | 7/2014 | Kuzmin | G06F 12/0246 711/103 |

OTHER PUBLICATIONS

Primmer, R., "Distributed Object Store Principles of Operation: The Case for Intelligent Storage," White Paper, Hitachi Data Systems Corporation, (Jul. 2010).

Rodeh, O., "B-trees, Shadowing, and Clones," *ACM Transactions on Computational Logic*, vol. V, No. N (Aug. 2007).

* cited by examiner

*Primary Examiner* — Phong Nguyen

(74) *Attorney, Agent, or Firm* — Hamilton, Brook, Smith & Reynolds, P.C.

(57) ABSTRACT

A deferred mechanism of rolling attribute changes to objects at transaction commit time is described. To support rolling updates, attributes are categorized into three types—increment, decrement or replace. Since transactions are committed in order, the update process uses a notification list of dependent transactions to propagate attribute changes as a function of attribute category or type. Shadow based file-systems (with or without object versioning) realize efficiency gains by employing the deferred mechanism.

20 Claims, 5 Drawing Sheets

UPDATING OBJECT ATTRIBUTES IN A LOCK-COUPLED NAMESPACE TRAVERSAL

BACKGROUND

Distributed file systems can be easily overwhelmed when providing concurrent access to file objects. When changes are made to file objects, the attributes of the file objects may change as well. These changes are generally written to persistent memory in the order they are committed. Waiting for write access to persistent memory causes significant delays in subsequent read and/or write requests to the same file objects.

SUMMARY

The present invention addresses disadvantages of the prior art and provides updating object attributes in a lock-coupled namespace traversal. Methods and systems described herein maintain object attributes in a shadowed file system. In one embodiment, object attributes may be organized by attribute category. Embodiments generate a notification list of transactions to propagate (transmit) rolling updates to the object attributes in the shadowed file system. In particular, an attribute category may be associated with a physical or logical size. For example, the physical size includes an increment and/or decrement operation as one attribute type and the logical size includes a replace as another attribute operation type. Thus, the list of transactions propagates rolling updates to object attributes as a function of attribute category.

A tree structure (e.g., B-tree, B+tree, or similar data structure) represents the shadowed file system. Methods and systems receive a transaction modifying a first object in the shadowed file system. In one embodiment, the update process adds (stacks or appends) an extent associated with the first object to a dirty buffer queue within the transaction. In this manner, the update process creates a rolling update entry within the transaction. Embodiments schedule the transaction(s) to commit changes to a persistent storage device. For example, where the update process receives a second and third transaction shadowing the first object, the second and third transaction may follow a pointer associated with the first object.

Embodiments of the update process may include a shadowed file system with object versioning. Object versioning may involve creating a second object version from a first object version. A rolling update entry for each object version may be created and transactions may be scheduled to commit to a persistent storage device for each object version. Methods and systems maintain (store) object data in the shadowed file system with lock-coupling, write changes to the object data and to the object attributes in parallel.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of embodiments follows.

Attributes are an integral part of an object in a file-system. File-system attributes are located within a file-object and updated in a transaction with a lock held on the object. But an attribute like physical size cannot be updated until all the data have been written to extents. When a lock-coupled traversal is used to write file-object extents, a lock is held only at two levels (parent and current) so object-lock cannot be guaranteed to be held making it difficult to update the attributes in the object.

Figure 1:
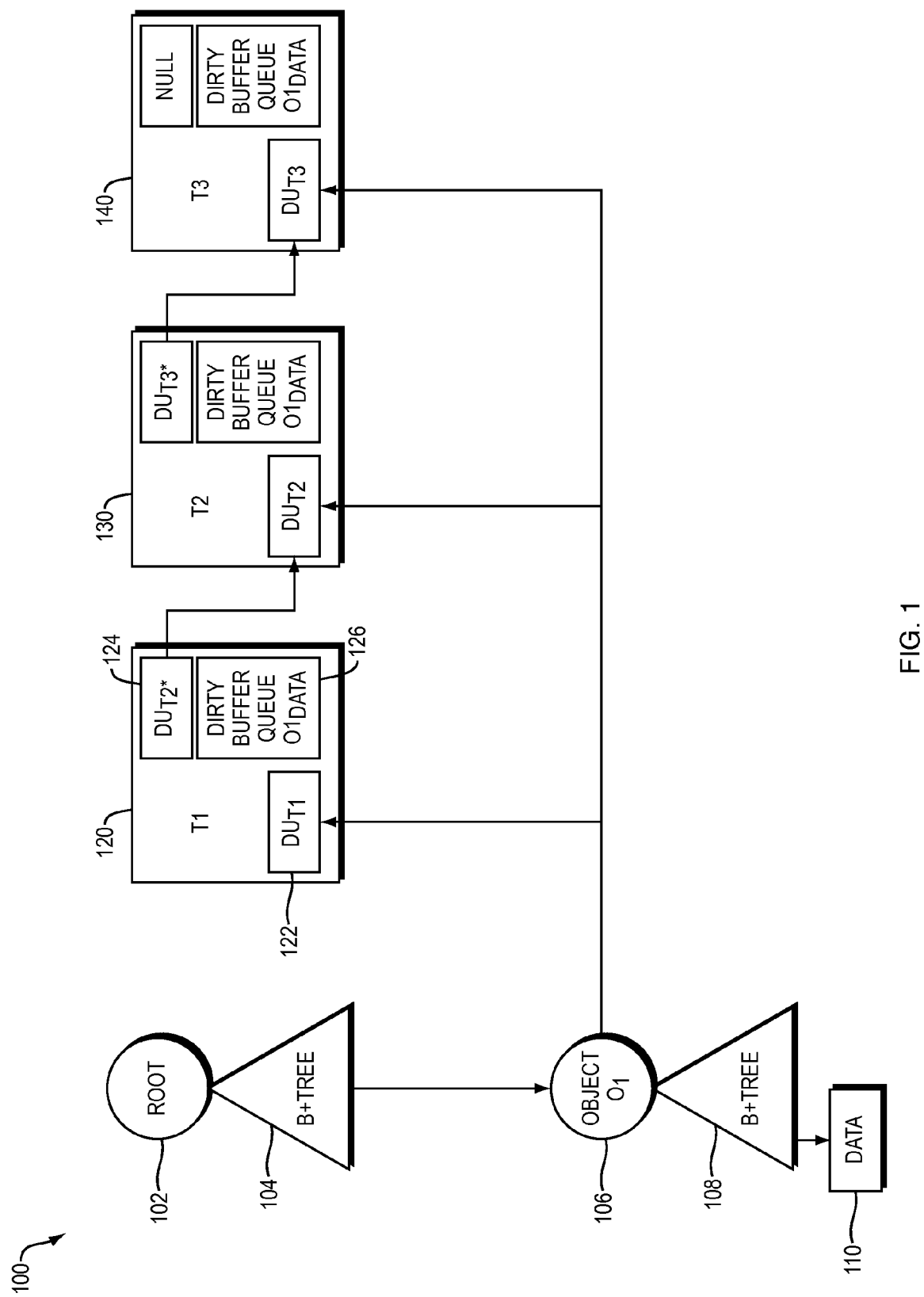
FIG. 1 is a schematic diagram of a simple shadowed file system with no versioning according to one embodiment.

FIG. 1 is a schematic diagram of a simple shadowed file system 100 with no versioning according to one embodiment. The schematic diagram includes a root node 102, a root node B+tree 104, an file-object $O_1$ 106, a file-object B+tree 108, and a data node 110. As illustrated in FIG. 1, file-object $O_1$ 106 is being modified by transaction $T_1$ 120. Transactions may include a deferred update entry 122, a deferred update queue 124 and a dirty buffer queue 126.

Deferred update entry 122 and dirty buffer queue 126 may be initiated for each transaction. These data structures capture the changes made by a given transaction. In one embodiment, the deferred update queue 124 may be instantiated if there exists another transaction $T_2$ 130 created after $T_1$ 120.

The individual transactions may maintain deferred updates (DUs) and roll them into object buffers at commit time. To simplify the updates, the update process may de-couple DUs from file-objects. In this manner, DUs do not understand the use-case of attributes and their relationship to the objects. This transparency may be attained by grouping attributes into three use-case categories. The three use-case categories may include increase, decrease and replace. Transactions thus update object attributes as a function of attribute category (or type), i.e. increase, decrease and replace.

For example, when the update process performs a write operation on an object, a physical size of an object either grows or shrinks with respect to the previous state of the object. In contrast, a Logical size (or eof) varies depending on the offset of the individual write operation. A physical size can thus be represented as an increment/decrement type of attribute and the logical size can be represented as a replace type attribute in DU. So the DU can thus operate on attributes using a simple mathematical scheme without understanding complex relationship hierarchy of different attributes to objects.

As shown in FIG. 1, object $O_1$ 106 is being modified by transaction $T_1$ 120 in a shadowed file-system using lock-coupling. $O_1$ 106 is first shadowed and the extent added to the dirty buffer queue 126 within transaction 120 as $O1_{Data}$. A deferred-update entry $DU_{T1}$ is then created at 122 within $T_1$ and Object $O_1$ stores a pointer to it. In one embodiment, the deferred-update entry 122 data structure $DU_{T1}$ may store attribute related updates to $O_1$ that may be processed without lock. When all changes are complete, transaction $T_1$ is scheduled for commit. At this time, changes from $DU_{T1}$ are rolled into the dirty buffer queue $O1_{Data}$ and written to a persistent disk.

FIG. 1 further illustrates transactions $T_2$ 130 and $T_3$ 140. Transactions $T_2$ and $T_3$ shadow object $O_1$ and run alongside $T_1$ 120. When $T_2$ attempts to shadow object $O_1$, it will follow the DU pointer of $O_1$ and adds itself to the deferred-update queue $DU_{T2}$ 124. In this manner, $T_1$ notifies $T_2$ during commit. The DU pointer of object $O_1$ is updated to point to the most recent copy which is $DU_{T2}$ in deferred update queue 124. Similarly, when $T_3$ shadows object $O_1$, it will follow the pointer of object $O_1$ and add itself to the deferred-update queue $DU_{T3}$ maintained by $T_2$. Since transactions are committed in order and DU changes are gathered cumulatively, it would suffice for each transaction to roll changes to the next dependent DU in the list avoiding the need to broadcast to multiple DUs.

When $T_1$ 120 commits, the changes gathered by $DU_{T1}$ (at deferred update entry 122) are rolled into $O1_{Data}$ (in dirty buffer queue 126) and then into $DU_{T2}$. Now $DU_{T2}$ will have the changes made by $T_1$. So when $T_2$ is ready to commit, its changes get added to existing changes from $T_1$ and rolled into $O_1$. Transactions that shadow objects are guaranteed to receive the changes from previously committed transactions. When a failure is encountered in a transaction holding DU changes from previous transactions, due to the nature of lock-coupling, the past DU updates may still be rolled into object extent and any DU changes made by the failing transaction may be reverted before committing extents to disk.

Figure 2:
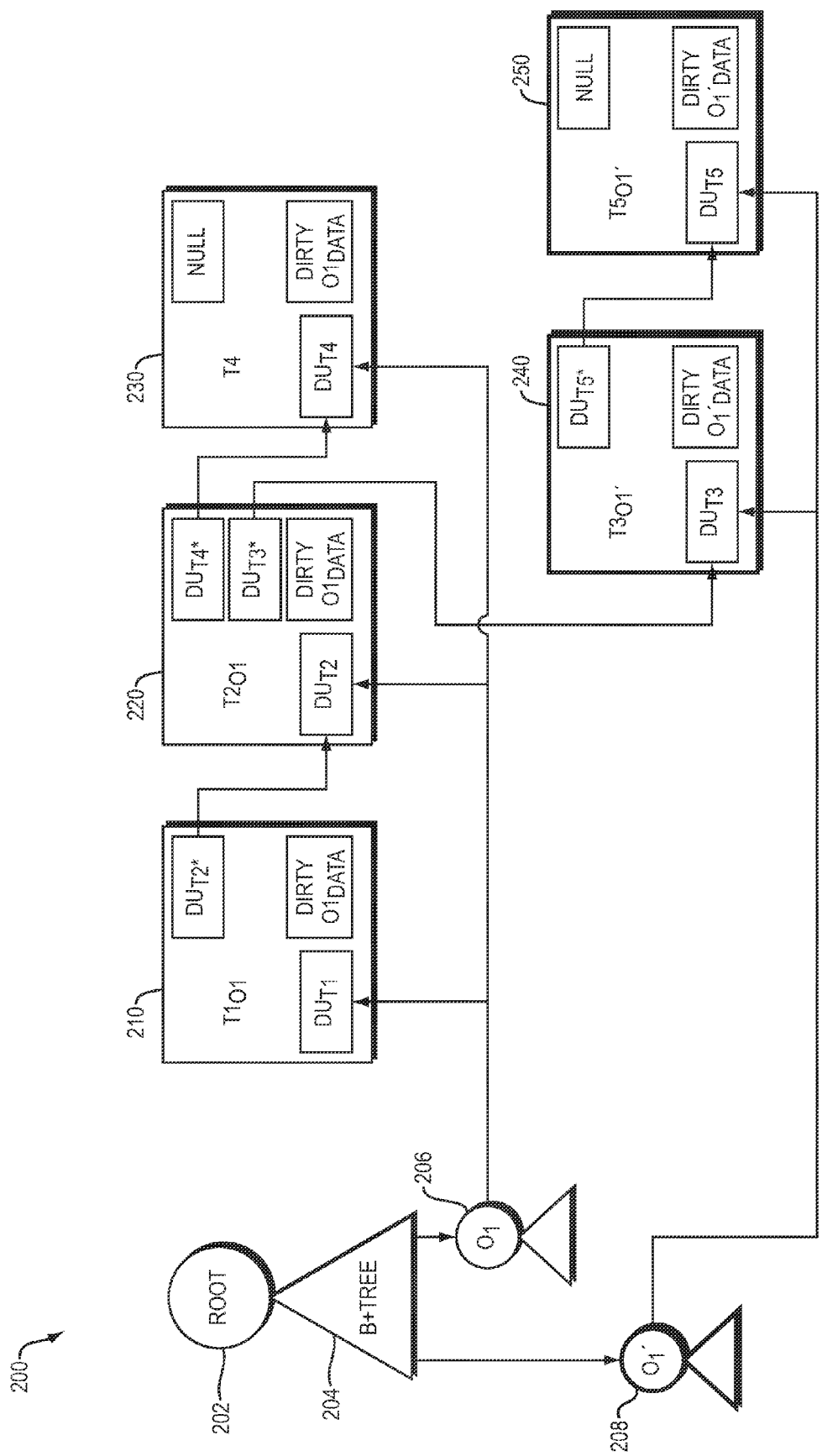
FIG. 2 is a schematic diagram of a shadowed file system with object versioning according to one embodiment.

FIG. 2 is a schematic diagram of a shadowed file system 200 with object versioning according to one embodiment. FIG. 2 illustrates a root node 202, a B+tree 204, a file-object $O_1$ 206, a file-object version $O_1'$ 208, and transactions $T_1$-$T_5$, 210, 220, 230, 240, and 250, respectively. Each transaction $T_1 \ldots T_5$ has respective deferred update entry, dirty buffer queue and deferred update queue as described in FIG. 1.

A shadowed file-system with object versioning may also employ deferred updates. As illustrated in FIG. 2, Transaction $T_3$ shadows object $O_1$ 206 and creates a version of object $O_1$ called $O_1'$ 208. Commensurate with the shadow protocol described earlier, $T_3$ creates deferred update entry $DU_{T3}$ and adds it to the deferred update queue of transaction $T_2$. $T_2$ can notify $T_3$ when deferred updates are ready to roll-over. If $T_4$ and $T_5$ were created at the same time operating on $O_1$ and $O_1'$ respectively, the respective object's DU pointer guides the transaction to the right DU queue (deferred update queue of the respective previous transaction. For example, $O_1$—which has its DU pointer now pointing at $T_2$—will be used by $T_4$ so $T_4$ adds itself $DU_{T4}$ to the deferred update queue of $T_2$. While $T_5$—which is operating on $O_1'$—will use the DU pointer of $O_1'$ which is now pointing at $T_3$ and adds itself $DU_{T5}$ to the deferred update queue of $T_3$. In other words, $T_4$ adds $DU_{T4}$ to $T_2$ and $T_5$ adds $DU_{T5}$ to $T_3$ respectively. Since a new version of the object was created at transaction $T_2$, notice that $T_2$ now has to roll its changes over to two transaction DUs namely $DU_{T3}$ and $DU_{T4}$.

Figure 3:
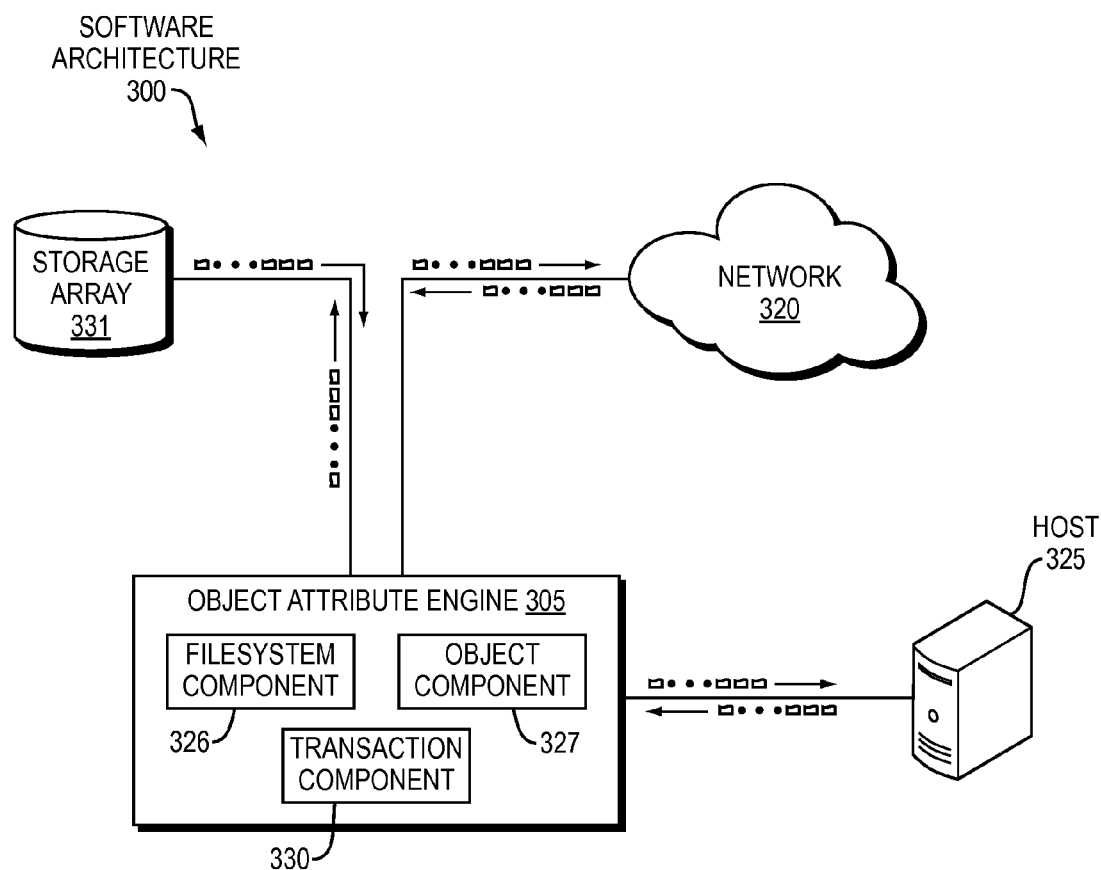
FIG. 3 is a block diagram of a software architecture for updating object attributes in a lock-coupled namespace traversal according to one embodiment.

FIG. 3 is a block diagram of a software architecture 300 for updating object attributes in a lock-coupled namespace traversal according to one embodiment. The software architecture 300 may include an object attribute engine 305, a host 325, a storage array 331 and a network 320. The object attribute engine 305 may include a filesystem component 326, an object component 327 and a transaction component 330. The object attribute engine 305 may manage objects 106, 206, 208, file systems 100, 200 and transactions $T_n$ in conducting the update process as described in FIGS. 1 and 2.

The file system component 326 may be in communication with the object attribute engine 305, engine components 327, 330 as well as other remote components (not shown) over the network 320. For example, the file system 326 component may engage with an external Application Programmer's Interface (API) in communicating with external components over the network 320. In one embodiment, the file system 326 component receives and maintains an instance of a file system 100, 200 (shadowed or unshadowed).

The object component 327 is responsible for instantiating objects 106, 206, 208 associated with the file system 100, 200. For example, file objects 106, 206 (and respective object versions 208) may be created, maintained and updated (as described above in FIGS. 1 and 2) by the object component 327. The object component 327 may be in communication with the storage array 331 and network 320. In one embodiment, the object component 327 provides instructions to store one or more versions of an object in the storage array 331. The object component 327 may be in communication with the object attribute engine 305, engine components 326, 330, as well as other external components (not shown). Communication to external components may be accomplished by sending messages through an API over the network 320.

The transaction component 330 manages transactions $T_n$, for example, rolling updates to the file system 100, 200 and respective file objects 106, 206, 208. In one embodiment, the transaction component 330 creates a transaction data structure. The transaction data structure may include a Transaction, a deferred update data structure 122, deferred update queue 124 and a dirty buffer queue 126. The transaction component 330 may defer updates to a file object until the updates can be written in order as a batch. The transaction component 330 may be in communication with the object attribute engine 305, engine components 326, 327 and other external components via an API over the network 320. In one embodiment, the object attribute engine 305 may include an internal API providing access to engine components (filesystem component 326, object component 327 and/or transaction component 330) to remote components (not shown).

Figure 4:
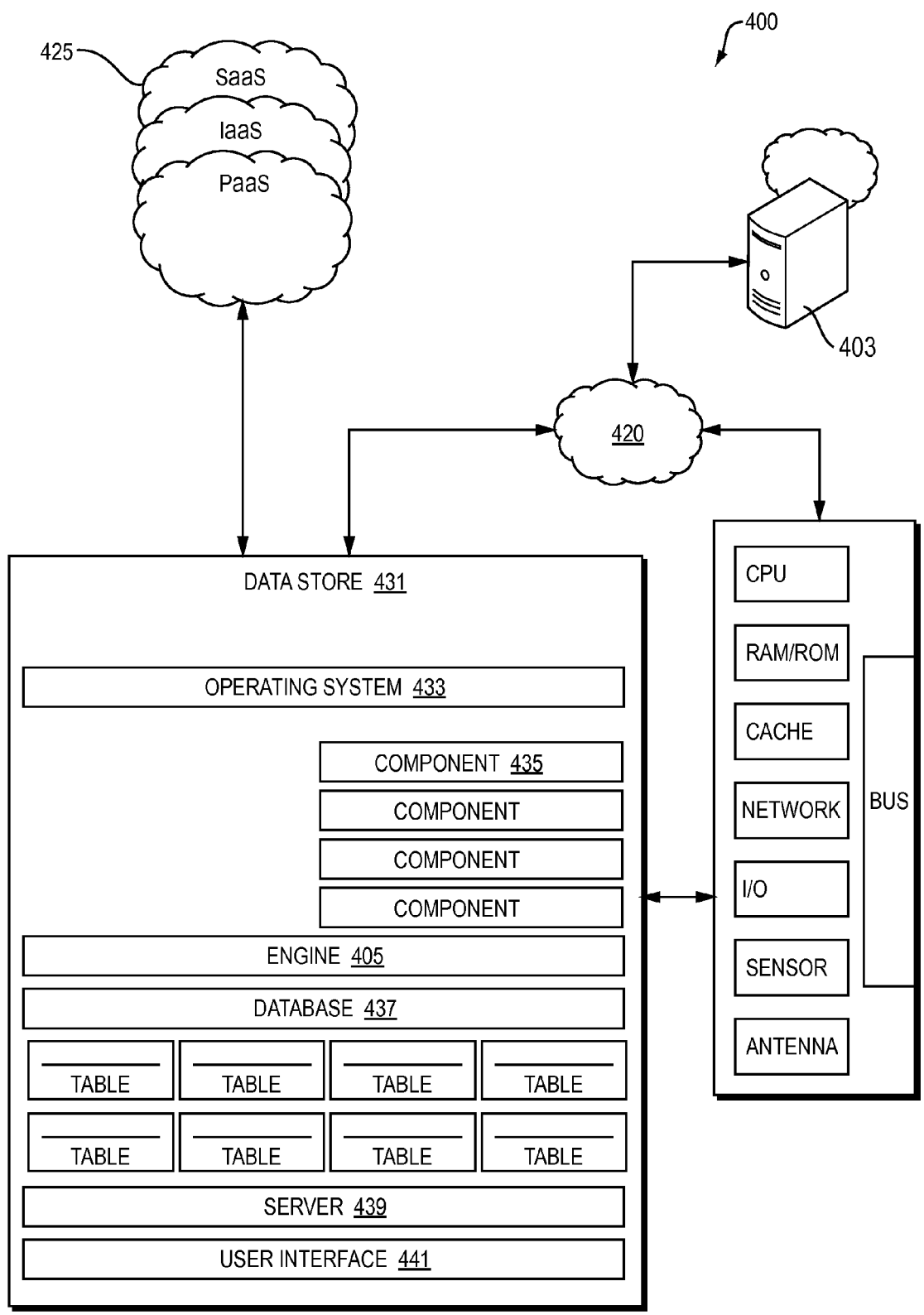
FIG. 4 is a block diagram of a computer system architecture for updating object attributes in a lock-coupled namespace traversal according to one embodiment.

FIG. 4 is a block diagram of a computer system architecture executing object attribute engine 305 for updating object attributes in a lock-coupled namespace traversal according to one embodiment. The Object Attributes system 400 of FIG. 4 may serve to aggregate, process, store, search, serve, identify, instruct, generate, match, and/or facilitate interactions with a computer. Computers employ processors to process information; such processors may be referred to as central processing units (CPU). CPUs use communicative circuits to pass binary encoded signals acting as instructions to enable various operations. These instructions may be operational and/or data instructions containing and/or referencing other instructions and data in various processor accessible and operable areas of memory. Such instruction passing facilitates communication between and among one or more virtual machines, one or more instances of the object attribute engine, one or more object attribute engine components, as well as third party applications. Should processing requirements dictate a greater amount speed and/or capacity, distributed processors (e.g., Distributed Cache) mainframe, multi-core, parallel, and/or super-computer architectures may similarly be employed. Alternatively, should deployment requirements dictate greater portability, mobile device(s), tablet(s) Personal Digital Assistants (PDAs) may be employed.

The host(s), client(s) and storage array(s) may include transceivers connected to antenna(s), thereby effectuating wireless transmission and reception of various instructions over various protocols; for example the antenna(s) may connect over Wireless Fidelity (WiFi), BLUETOOH, Wireless Access Protocol (WAP), Frequency Modulation (FM), or Global Positioning System (GPS). Such transmission and reception of instructions over protocols may be commonly referred to as communications. In one embodiment, the object attribute engine 305 may facilitate communications through a network 420 between or among the hypervisor and other virtual machines. In one embodiment, a hypervisor and other components may be provisioned as a service 425. The service may include a Platform-as-a-Service (PaaS) model layer, an Infrastructure-as-a-Service (IaaS) model layer and a Software-as-a-Service (SaaS) model layer. The SaaS model layer generally includes software managed and updated by a central location, deployed over the Internet and provided through an access portal. The PaaS model layer generally provides services to develop, test, deploy, host and maintain applications in an integrated development environment. The IaaS layer model generally includes virtualization, virtual machines, e.g., virtual servers, virtual desktops and/or the like.

Depending on the particular implementation, features of the object attribute system and components of object attribute engine may be achieved by implementing a specifically programmed microcontroller. Implementations of the object attribute system 400 and functions of the components of the object attribute engine 305 include specifically programmed embedded components, such as: Application-Specific Integrated Circuit ("ASIC"), Digital Signal Processing ("DSP"), Field Programmable Gate Array ("FPGA"), and/or the like embedded technology. For example, any of the object attribute system Engine Set 405 (distributed or otherwise) and/or features may be implemented via the microprocessor and/or via embedded components. Depending on the particular implementation, the embedded components may include software solutions, hardware solutions, and/or some combination of both hardware/software solutions. For example, object attribute system features discussed herein may be achieved in parallel in a multi-core virtualized environment. Storage interfaces, e.g., data store 431, may accept, communicate, and/or connect to a number of storage devices such as, but not limited to: storage devices, removable disc devices, such as Universal Serial Bus (USB), Solid State Drives (SSD), Random Access Memory (RAM), Read Only Memory (ROM), or the like.

Remote devices may be connected and/or communicate to I/O and/or other facilities of the like such as network interfaces, storage interfaces, directly to the interface bus, system bus, the CPU, and/or the like. Remote devices may include peripheral devices and may be external, internal and/or part of object attribute engine. Peripheral devices may include: antenna, audio devices (e.g., line-in, line-out, microphone input, speakers, etc.), cameras (e.g., still, video, webcam, etc.), external processors (for added capabilities; e.g., crypto devices), printers, scanners, storage devices, transceivers (e.g., cellular, GPS, etc.), video devices (e.g., goggles, monitors, etc.), video sources, visors, and/or the like.

The memory may contain a collection of program and/or database components and/or data such as, but not limited to: operating system component 433, server component 439, user interface component 441; database component 437 and component collection 435. These components may direct or allocate resources to object attribute engine components. A server 439 may include a stored program component that is executed by a CPU. The server 439 may allow for the execution of object attribute engine components through facilities such as an API. The API may facilitate communicate to and/or with other components in a component collection, including itself, and/or facilities of the like. In one embodiment, the server 439 communicates with the object attribute system database 437, component collection 435, a web browser, a remote client, or the like. Access to the object attribute system database may be achieved through a number of database bridge mechanisms such as through scripting languages and through inter-application communication channels. Computer interaction interface elements such as check boxes, cursors, menus, scrollers, and windows similarly facilitate access to object attribute engine components, capabilities, operation, and display of data and computer hardware and operating system resources, and status.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 403. For example, a non-transient machine-readable medium may include read only memory (ROM); random access memory (RAM); magnetic disk storage media; optical storage media; flash memory devices; and others.

Figure 5:
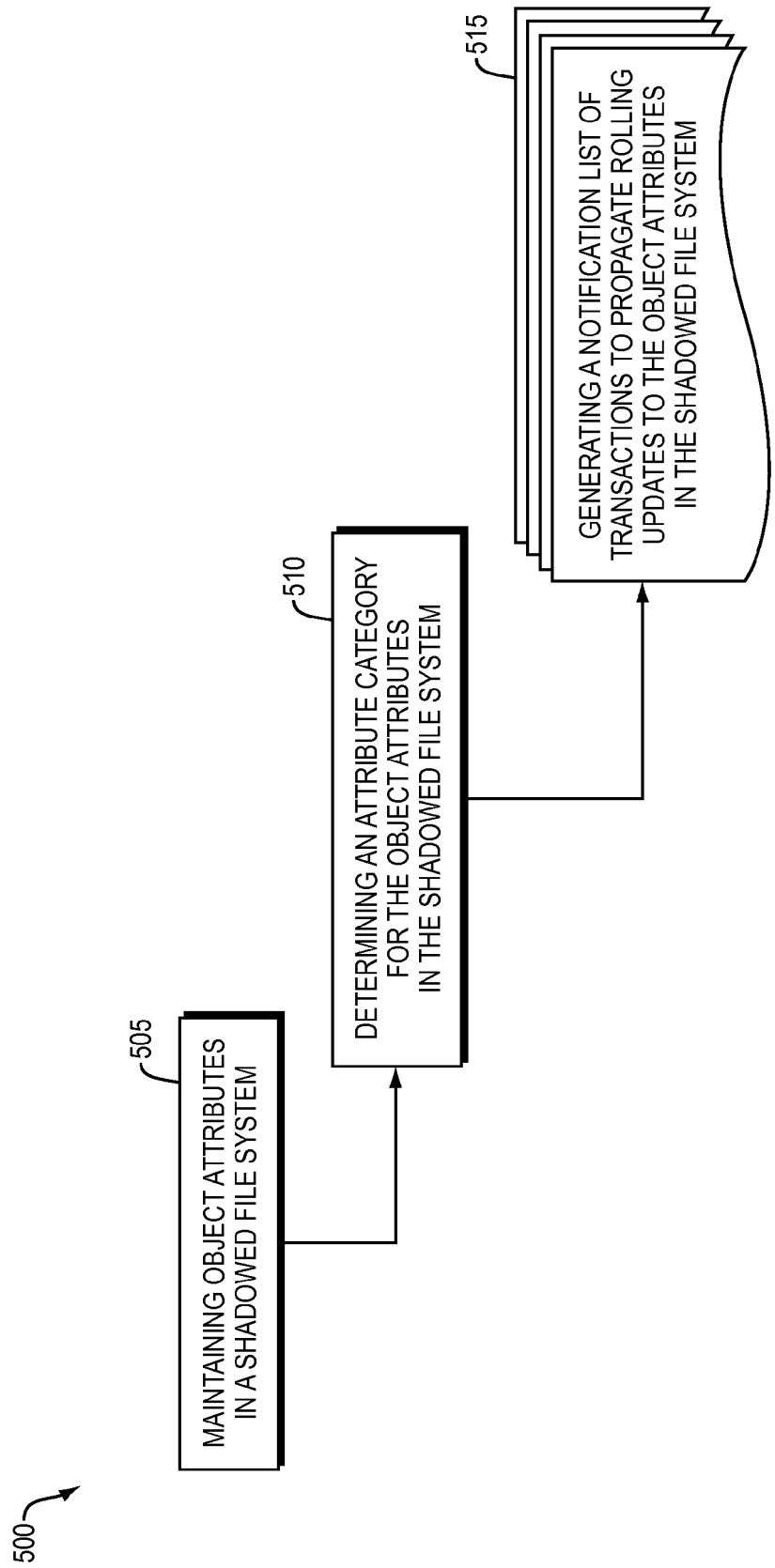
FIG. 5 is a flow diagram illustrating one embodiment of a process for updating object attributes in a lock-coupled namespace traversal.

FIG. 5 is a flow diagram illustrating one embodiment of a computer process 500 updating object attributes in a lock-coupled namespace traversal. The process 500 includes maintaining object attributes in a shadowed file system 505. In one embodiment, the update object attributes process determines an attribute category for the object attributes in the shadowed file system 510. FIG. 5 also illustrates generating a notification list of transactions to propagate rolling updates to the object attributes in the shadowed file system 515. Through a list of one or more transactions, process 500 (i.e., step 575) propagates rolling updates to the object attributes according to determined attribute category. This is accomplished by employing the techniques and data structures described above in FIGS. 1 and 2.

While this invention has been particularly shown and described with references to example embodiments thereof, it will be understood by those skilled in the art that various changes in form and details may be made therein without departing from the scope of the invention encompassed by the appended claims.

What is claimed is:

1. A method, comprising:
given an object having object attributes, maintaining the object attributes in a shadowed file system, such that changes to the object attributes in the shadowed file system are decoupled from the object stored in a corresponding file system, and said changes result in changed object attributes;
for each object attribute in the shadowed file system, determining a respective attribute category; and
through a list of one or more ordered transactions, propagating rolling updates of the changed object attributes to the object, wherein the rolling updates of each changed object attribute is propagated to the object according to the respective determined attribute category, and wherein a rolling update of changed object attributes propagated through one ordered transaction is automatically added to a next in order ordered transaction, such that a rolling update being propagated through a later ordered transaction includes changed object attributes of each earlier ordered transaction in the list of ordered transactions.

2. The method of claim 1 wherein the attribute category is associated with a physical or logical size, the physical size including an increment and decrement operation as one attribute type and the logical size including a replace operation as another attribute type.

3. The method of claim 1, further comprising:
providing a tree structure representing the shadowed file system.

4. The method of claim 3 wherein the tree structure representing the shadowed file system is a B+tree.

5. The method of claim 1, further comprising:
receiving a first transaction modifying a first object attribute in the shadowed file system;
adding an extent associated with the first object attribute to a dirty buffer queue within the first transaction; and
creating a rolling update entry within the first transaction.

6. The method of claim 5, further comprising:
scheduling the first transaction to commit changes to a persistent storage device.

7. The method of claim 5, further comprising:
receiving a second and third transaction shadowing the first object in the shadowed file system, the second and third transaction following a pointer associated with the first object in the corresponding file system.

8. The method of claim 1 wherein the shadowed file system includes object versioning.

9. The method of claim 1, further comprising:
creating a second object version from a first object version;
creating a rolling update entry for each object version; and
scheduling transactions to commit to a persistent storage device for each object version.

10. The method of claim 1, further comprising:
maintaining object attributes in the shadowed file system respective to object data in the corresponding file system; and
writing changes to the object data in the corresponding file system and to the object attributes in the shadowed file system in parallel.

11. The method of claim 10 wherein the shadowed file system includes lock-coupling.

12. A system, comprising:
a memory;
a processor, in operable communication with the memory, executing computer program instructions, configured to:
given an object having object attributes, maintain the object attributes in a shadowed file system, such that changes to the object attributes in the shadowed file system are decoupled from the object stored in a corresponding file system, and said changes result in changed object attributes;
for each object attribute in the shadowed file system, determine a respective attribute category; and
through a list of one or more ordered transactions, propagate rolling updates of the changed object attributes to the object, wherein the rolling updates of each changed object attribute is propagated to the object according to the respective determined attribute category, and wherein a rolling update of changed object attributes propagated through one ordered transaction is automatically added to a next in order ordered transaction, such that a rolling update being propagated through a later ordered transaction includes changed object attributes of each earlier ordered transaction in the list of ordered transactions.

13. The system of claim 12, wherein the processor executing computer program instructions, is further configured to: provide a B+ tree structure representing the shadowed file system.

14. The system of claim 12, wherein the processor executing computer program instructions, is further configured to:
receive a first transaction modifying a first object attribute in the shadowed file system;
add an extent associated with the first object attribute to a dirty buffer queue within the first transaction; and
create a rolling update entry within the first transaction.

15. The system of claim 14, wherein the processor executing computer program instructions, is further configured to:
schedule the first transaction to commit changes to a persistent storage device; and
receive a second and third transaction shadowing the first object in the shadowed file system, the second and third transaction following a pointer associated with the first object in the corresponding file system.

16. The system of claim of claim 12, wherein the processor executing computer program instructions is further configured to support object versioning for the shadowed file system.

17. The system of claim 12, wherein the processor executing computer program instructions, is further configured to:
from a first object version, generate a second object version;
for each object version, create a rolling update entry; and
schedule transactions to commit to a persistent storage device for each object version.

18. The system of claim 12, wherein the processor executing computer program instructions, is further configured to:
support lock-coupling for the shadowed file system;
maintain each object attribute in the shadowed file system respective to object data in the corresponding file system; and
write changes to the object data and to the respective object attribute in parallel.

19. A data handling system comprising:
at least one processor; and computer memory together with the at least one processor including:
a shadowed file system maintaining object attributes of an object, such that changes to the object attributes are decoupled from the object stored in a corresponding file system, and such that said changes result in changed object attributes;
an object attribute engine determining a respective category for each object attribute of the shadowed file system; and
a transaction component configured to perform a list of one or more ordered transactions, the transaction component propagating rolling updates of the changed object attributes to the object, wherein the rolling updates of each changed object attribute is propagated to the object according to the respective determined attribute category, and wherein a rolling update of changed object attributes propagated through one ordered transaction is automatically added to a next in order ordered transaction, such that a rolling update being propagated through a later ordered transaction includes changed object attributes of each earlier ordered transaction in the list of ordered transactions.

20. The system of claim 12 wherein the attribute category is associated with a physical or logical size, the physical size including an increment and decrement operation as one attribute type and the logical size including a replace operation as another attribute type.

* * * * *